March 2, 1926.
M. L. ENGLER
1,575,421
EXPANSIBLE CORE FOR USE IN VULCANIZING TIRE
CASINGS AND METHOD OF MANUFACTURING SAME
Filed Nov. 23, 1923
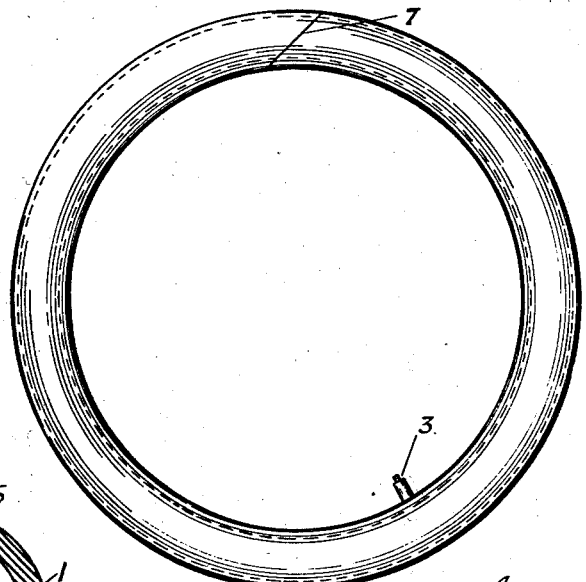
FIG.-1.
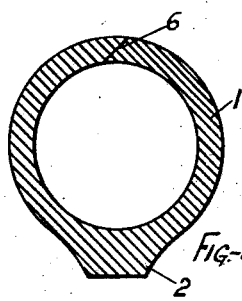
FIG.-3.
FIG.-2   FIG.-2ª
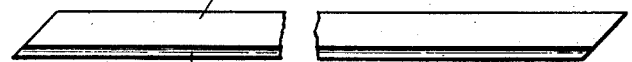
FIG.-4.
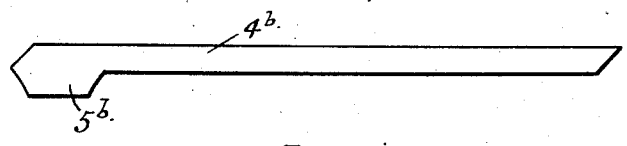
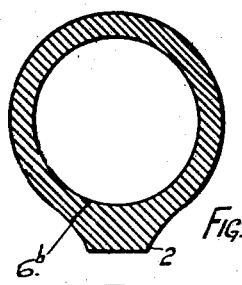
FIG.-5.
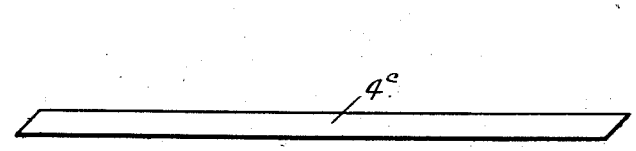
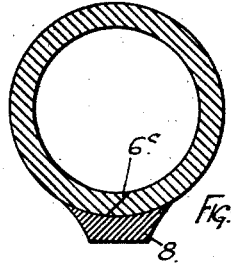
FIG.-7.
FIG.-8
FIG.6.
Inventor
MAXIMILLIAN L. ENGLER.
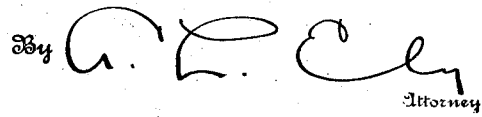
Attorney Patented Mar. 2, 1926.

1,575,421

UNITED STATES PATENT OFFICE.

MAXIMILLIAN L. ENGLER, OF AKRON, OHIO, ASSIGNOR TO THE GENERAL TIRE AND RUBBER COMPANY, OF AKRON, OHIO, A CORPORATION OF OHIO.

EXPANSIBLE CORE FOR USE IN VULCANIZING TIRE CASINGS AND METHOD OF MANUFACTURING SAME.

Application filed November 23, 1923. Serial No. 676,499.

*To all whom it may concern:*

Be it known that I, MAXIMILLIAN L. ENGLER, a citizen of the United States, and a resident of Akron, county of Summit, State of Ohio, have invented certain new and useful Improvements in Expansible Cores for Use in Vulcanizing Tire Casings and Methods of Manufacturing Same, of which the following is a specification.

This invention relates to collapsible cores such as used for vulcanizing tires while they are subjected to initial fluid pressure. These cores are commonly known in the art as "air bags" and are designed to be placed within the tires while they are in the mold during the vulcanizing operation. These cores are connected to a source of external fluid pressure so that the core and tire are expanded and the latter cured while it is in expanded condition. These cores or air bags are made of rubber or rubber and fabric and constitute a considerable item in the manufacture of pneumatic tires.

It is the purpose of the present invention to improve upon the construction of the air bag and upon the method of manufacturing it.

In the drawings are shown several embodiments of the invention, illustrating different ways in which it may be put into operation, and it will be understood that the showing is for the purpose of enabling those skilled in the art to practise the same.

In the drawings:

Figure 1 is a side elevation of a completed air bag;

Figure 2 represents one method of manufacturing the bag, while Figure 3 is a cross section of the completed bag made in accordance with Figure 2;

Figure 2ª is a side elevation of Figure 2;

Figure 4 shows a second method of manufacturing the bag, while Figure 5 is a cross section of the completed bag made in accordance with Figure 4;

Figure 6 shows a still further method of manufacturing the bag, and Figure 7 is a cross section of the bag made in accordance with Figure 6;

Figure 8 is a detail section of part of the bag shown in Figure 7.

The air bag of the present invention is preferably made of rubber and, when completed in the form of a hollow annular body 1, is provided with the usual thickened tongue 2 adapted to be placed between the beads of the tire. The air bag carries the usual valve stem 3 for inflation purposes.

In the form of the invention shown in Figures 2 and 3, the bag is made in accordance with the following steps. A sheet or slab of rubber 4 is formed in the cross section of an elongated parallelogram with two narrow sides at an angle to the plane of the slab. At its central portion is formed a substantially angular extension or rib 5. This slab may be formed in any suitable manner, preferably by tubing or extruding through a die of proper shape.

A length of the slab of the proper dimensions is cut off by parallel inclined cuts so that the ends of the slab are as shown in Figure 2ª. The slab of rubber is now folded over so that the inclined sides meet in a splice 6, the rib being on the outside of the core. The tube thus formed is then curved and the two ends brought together so as to form the inclined splice 7 across the annulus. In each instance the splices 6 and 7 are properly buffed and cemented, or otherwise treated in any way known to the art, so as to obtain a tight adhesion of the rubber. The valve 3 may be inserted at any suitable time. The continuous annulus is vulcanized so as to make the completed air bag, the extension 5 constituting the tongue 2 which is received between the beads of the tire.

In the modification shown in Figures 4 and 5, the splice at the crown of the air bag, as in the earlier form, is avoided by forming the rib 5ᵇ at or near one side of the slab of rubber which brings the splice 6ᵇ well down toward the tongue of the bag, and this form may be preferred to the form shown in Figure 3 as the splice is not subjected to as great a strain in the expansion of the bag.

In Figures 6, 7 and 8, a still further modification is shown in which the main slab of rubber 4ᶜ is formed in cross section as a parallelogram without the extension for the tongue. The portion for the tongue may be formed as a separate strip 8. In forming the bag in accordance with this modification, the splice 6ᶜ may be located on the inner circumference of the bag and covered by the strip 8. This will form a tight, durable bag and may be preferable to the other forms.

It is obvious that other methods may be devised and other shapes given to the slab from which the bag is produced. The object of the invention is to devise a cheap and easily operable method of manufacturing these articles, and the manner of doing so is to form the tube as a slab with or without the tongue as an integral part and, by folding and splicing, obtaining a finished product which fulfills the purposes herein set forth.

What is claimed is:

1. The process of manufacturing expansible cores for use in vulcanizing tires under internal pressure, comprising, forming a slab of vulcanizable material, forming a rib of vulcanizable material, folding the slab transversely and longitudinally to form a continuous core, folding the rib longitudinally to provide a projecting tongue on the inner circumference of the core, and curing the core thus formed.

2. The process of manufacturing expansible cores for use in vulcanizing tires under internal pressure, comprising the steps of forming a slab of vulcanizable material having a projecting rib extending longitudinally thereof, folding the slab both transversely and longitudinally to form a continuous core having a projecting tongue on its inner circumference adapted to seat between the beads of the tire, and curing the core thus formed.

3. The process of manufacturing expansible cores for use in vulcanizing tires under internal pressure, comprising the steps of forming a slab of vulcanizable material having inclined sides and a projecting rib extending longitudinally thereof, and folding the slab both transversely and longitudinally to form a continuous tube having a diagonal splice arranged circumferentially thereof, the projecting rib being located on the inner circumference of the core to form the tongue thereof.

4. The process of manufacturing expansible cores for use in vulcanizing tires under internal pressure, comprising the steps of forming a slab of vulcanizable material having ends formed at an inclination to the plane thereof and also having a projecting rib extending longitudinally of the slab, and folding the slab both transversely and longitudinally to form a core having a transverse splice arranged at an angle to the radius of the core and also having the projecting rib on its inner circumference to form the tongue of the core.

5. The process of manufacturing expansible cores for use in vulcanizing tires under internal pressure, comprising the steps of forming a slab of vulcanizable material having inclined sides and ends and a projecting rib extending longitudinally thereof, folding the slab with the rib outwardly thereof to constitute the tongue of the core, and forming the circumferential and transverse splices thus obtained.

6. An expansible core for use in vulcanizing tires under internal pressure, comprising a hollow annulus containing rubber having a single circumferential and transverse splice and a projecting tongue adapted to be received between the beads of the tire.

7. An expansible core for use in vulcanizing tires under internal pressure, comprising a hollow annulus containing rubber and having a single diagonal circumferential splice and a single diagonal transverse splice and a projecting tongue vulcanized therewith.

MAXIMILLIAN L. ENGLER.